(12) United States Patent
Iwasawa (10) Patent No.: US 7,342,727 B2
(45) Date of Patent: *Mar. 11, 2008

(54) ZOOM LENS AND IMAGE CAPTURE APPARATUS

(75) Inventor: Yoshito Iwasawa, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/607,007

(22) Filed: Dec. 1, 2006

(65) Prior Publication Data

US 2007/0127124 A1 Jun. 7, 2007

(30) Foreign Application Priority Data

Dec. 7, 2005 (JP) ............................ P2005-353397

(51) Int. Cl.
G02B 15/14 (2006.01)
G02B 27/64 (2006.01)

(52) U.S. Cl. ..................... 359/686; 359/557; 359/689

(58) Field of Classification Search ................ 359/554, 359/557, 687, 686, 447
See application file for complete search history.

(56) References Cited

U.S. PATENT DOCUMENTS 6,512,633 B2 * 1/2003 Konno et al. ................ 359/557

FOREIGN PATENT DOCUMENTS

JP 11-052245 2/1999

* cited by examiner

*Primary Examiner*—Scott J. Sugarman
(74) *Attorney, Agent, or Firm*—Rader Fishman & Grauer PLLC; Ronald P. Kananen (57) ABSTRACT

A zoom lens includes, in the following order from an object side: a first lens group including negative refractive power; a second lens group including negative refractive power; and a third lens group. At least the second and third lens groups are movable along an optical axis to perform a zooming action. The second lens group is movable in a direction orthogonal to the optical axis to shift an image in a direction orthogonal to the optical axis. The following (1) and (2) are satisfied:

$$0.5 < (1-\beta a) \times \beta b < 1.0, \text{ and} \quad (1)$$

$$0.1 < |f1/f2| < 1.25, \text{ where} \quad (2)$$

$\beta a$ is the magnification of the second lens group at a telephoto end of the zoom lens; $\beta b$ is the magnification of a lens group on an image side relative to the second lens group; and $f1$, $f2$ are focal lengths of the first, second lens group, respectively.

6 Claims, 7 Drawing Sheets

ZOOM LENS AND IMAGE CAPTURE APPARATUS

BACKGROUND OF THE INVENTION

1. Field of the Invention

The present invention relates to a zoom lens and image capture apparatus and more particularly, to a zoom lens having, for example, a camera shake correction function, i.e., the function of correcting the shifting of a captured image due to a vibration or movement of a camera, and an image capture apparatus provided with such zoom lens. More specifically, the present invention relates to a zoom lens having a compact and good camera shake correction function suitable for use in an image-capturing optical system for digital input/output devices, such as digital still cameras and digital video cameras, and to an image capture apparatus provided with such zoom lens.

2. Description of Related Art

In recent years, image capture apparatuses using solid-state image capture devices, such as digital cameras, have been spreading. With the spread of such digital still cameras, demand is rising for a far higher image quality, and in the field of digital still cameras having a particularly large number of pixels, there is a demand for an image-capturing lens, particularly a zoom lens, which has the superior image-forming performance capability of solid-state image capture devices having a large number of pixels.

In addition, there is a strong demand for a camera shake correction function for preventing an image shake of a captured image due to a vibration during image-capturing.

For example, Japanese Patent Application Publication Number JPH11-52245 (Patent Literature 1) proposes a zoom lens having an optical system which is formed with a first lens group having negative refractive power, a second lens group having positive refractive power, a third lens group having positive refractive power, and a fourth lens group having positive or negative refractive power, the zoom lens being constructed to perform camera shake correction by moving the third lens group in a direction perpendicular to the optical axis.

SUMMARY OF THE INVENTION

The optical system described in Patent Literature 1 is of the zoom type in which the optical system has the first to third lens groups arranged in negative-positive-positive order and the second lens group is divided into sections, one of which is constructed as a shift lens group. Since the second lens group of high eccentricity sensitivity is divided into sections, one which is constructed as a shift lens group, it is very difficult to avoid an increase in the number of lens elements in the second lens group that is required to decrease the eccentricity sensitivity of the second lens group in order to reduce the amount of aberration occurring during camera shake correction. Accordingly, it is very difficult to reduce the depthwise thickness of an image capture apparatus, such as a camera, with the zoom lens being retracted.

In a zoom type generally used in compact cameras in which the first to third lens groups are arranged in negative-positive-positive order, camera shake correction can be performed by shifting the entire second lens group during the camera shake correction. In this type, however, an image shifts to a great extent even if the shift lens group moves to a slight extent, so that highly accurate control is required.

Accordingly, it is desirable to provide a zoom lens having a compact and good camera shake correction function suitable for use in an image-capturing optical system for digital input/output devices, such as digital still cameras and digital video cameras, as well as an image capture apparatus provided with such zoom lens. In view of the above-mentioned issues, the present invention is directed to a zoom lens having a camera shake correction function.

According to an embodiment of the present invention, there is provided a zoom lens which includes, in the following order from an object side, a first lens group having negative refractive power, a second lens group having negative refractive power, and a third lens group. At least the second lens group and the third lens group are movable along an optical axis to perform a zooming action, the second lens group is movable in a direction orthogonal to the optical axis to shift an image in a direction orthogonal to the optical axis, and the following conditional formulae (1) and (2) are satisfied:

$$0.5 < (1-\beta a) \times \beta b < 1.0, \text{ and} \quad (1)$$

$$0.1 < |f1/f2| < 1.25, \text{ where} \quad (2)$$

$\beta a$ represents the magnification of the second lens group at a telephoto end of the zoom lens, $\beta b$ represents the magnification of a lens group on an image side relative to the second lens group, f1 represents the focal length of the first lens group, and f2 represents the focal length of the second lens group.

Accordingly, in the zoom lens according to the above-mentioned embodiment of the present invention, when the second lens group is moved in a direction orthogonal to the optical axis, an image is shifted in a direction orthogonal to the optical axis.

According to another embodiment of the present invention, there is provided an image capture apparatus which includes a zoom lens having a shift lens group capable of shifting an image in a direction orthogonal to an optical axis by moving in a direction orthogonal to the optical axis, an image capture device converting an optical image formed by the zoom lens into an electrical signal, camera shake detection means for detecting a shake of the zoom lens, camera shake control means for calculating a shake correction angle for correcting an image shake due to the shake of the zoom lens detected by the camera shake detection means, and transmitting a correction signal so as to shift the shift lens group of the zoom lens in a direction approximately orthogonal to the optical axis by an amount corresponding to the shake correction angle, and camera shake drive means for shifting the shift lens group of the zoom lens in the direction approximately orthogonal to the optical axis on the basis of the correction signal. The zoom lens includes, in the following order from an object side, a first lens group having negative refractive power, a second lens group having negative refractive power, and a third lens group. At least the first lens group and the third lens group are movable along the optical axis to perform a zooming action, the second lens group is the shift lens group movable in the direction orthogonal to the optical axis to shift an image in the direction orthogonal to the optical axis, and the following conditional formulae (1) and (2) are satisfied:

$$0.5 < (1-\beta a) \times \beta b < 1.0, \text{ and} \quad (1)$$

$$0.1 < |f1/f2| < 1.25, \text{ where} \quad (2)$$

$\beta a$ represents the magnification of the second lens group at a telephoto end of the zoom lens, $\beta b$ represents the magnification of a lens group on an image side relative to the second lens group, f1 represents the focal length of the first lens group, and f2 represents the focal length of the second lens group.

Accordingly, in the image capture apparatus according to the above-mentioned embodiment of the present invention, when a shake of the zoom lens is detected, the second lens group is moved in a direction orthogonal to the optical axis such that an image is shifted in a direction orthogonal to the optical axis.

Accordingly, in the zoom lens according to the above-mentioned embodiment of the present invention, the first lens group having negative refractive power and the second lens group having negative refractive power are arranged in named order from the object side and the second lens group is constructed as a shift lens group to decrease eccentricity sensitivity without increasing the number of lens elements, thereby facilitating control of the movement of the shift lens group and reducing the amount of aberration occurring during image shifting.

Accordingly, in the image capture apparatus according to the above-mentioned embodiment of the present invention, when a shake of the zoom lens is detected, the second lens group is moved in a direction orthogonal to the optical axis such that an image is shifted in a direction orthogonal to the optical axis, i.e., a so-called camera shake correction is effected. In addition, it is possible to miniaturize the entire construction, and furthermore, it is possible to obtain a good-quality image reduced in aberration.

In the zoom lens according to the embodiment of the present invention, the lens group on the image side relative to the second lens group may include the third lens group having positive refractive power and a fourth lens group having positive refractive power in named order toward the image side.

In the zoom lens according to the embodiment of the present invention, the second lens group may have at least one aspherical surface, and the aspherical surface has a shape in which its curvature becomes smaller with respect to its paraxial curvature toward its periphery. Accordingly, in the zoom lens, distortion can be corrected with higher accuracy.

BRIEF DESCRIPTION OF THE DRAWINGS

The invention will become more readily appreciated and understood from the following detailed description of embodiments and numerical embodiments of the invention when taken in conjunction with the accompanying drawings, in which.

DETAILED DESCRIPTION OF EMBODIMENTS

Embodiments of a zoom lens and an image capture apparatus according to the present invention will be described below with reference to the accompanying drawings.

The zoom lens at least includes, in the following order from an object side, a first lens group which is formed with a single lens having negative refractive power, a second lens group having negative refractive power, and a third lens group, and at least the second lens group and the third lens group move along the optical axis to perform a zooming action. The zoom lens is capable of shifting an image in a direction orthogonal to the optical axis by moving the second lens group in the direction orthogonal to the optical axis, and the following conditional formulae (1) and (2) are satisfied:

$$0.5 < (1-\beta\alpha) \times \beta b < 1.0, \text{ and} \quad (1)$$

$$0.1 < |f1/f2| < 1.25, \text{ where} \quad (2)$$

βα: magnification of the second lens group at the telephoto end of the zoom lens;

βb: magnification of the lens group on an image side relative to the second lens group;

f1: focal length of the first lens group; and f2: focal length of the second lens group.

In the zoom lens, the first lens group having negative refractive power and the second lens group having negative refractive power are arranged in named order from the object side and the second lens group is constructed as a shift lens group to decrease eccentricity sensitivity without increasing the number of lens elements, thereby facilitating control of the movement of the shift lens group and reducing the amount of aberration occurring during image shifting.

The conditional formula (1) is a conditional formula which provides the ratio in which an image shifts with respect to the amount of movement of the shift lens group which is the shift lens group. If the value of $(1-\beta\alpha) \times \beta b$ falls below the lower limit value of the conditional formula (1), the amount of movement of the shift lens group that is required to shift an image by a predetermined amount increases, so that a drive system for moving the shift lens group becomes large in size and the miniaturization of the zoom lens is hindered. If the value of $(1-\beta\alpha) \times \beta b$ exceeds the upper limit value of the conditional formula (1), an image shifts in a large amount even when the shift lens group moves by a minute amount, so that highly accurate control is required.

The conditional formula (2) is a conditional formula which provides the ratio in focal length of the first lens group to the shift lens group. If the value of |f1/f2| falls below the lower limit value of the conditional formula (2), the focal length of the first lens group decreases, so that distortion becomes difficult to correct. If the value of |f1/f2| exceeds the upper limit value of the conditional formula (2), the focal length of the first lens group increases to incur an increase in the diameter of the front lens element, so that the zoom lens becomes difficult to miniaturize, while the focal length of the second lens group decreases to increase the eccentricity sensitivity of the second lens element, so that the amount of aberration occurring during camera shake correction becomes large.

The refractive power of the third lens group may be positive or negative, and the refractive power of each lens group is selected according to whether a lens group is to be arranged on the image side relative to the third lens group, as well as according to how many lens groups are to be arranged if a lens group is to be arranged on the image side relative to the third lens group. The zoom lens may be constructed with four lens groups, for example, in the following order from the object side, the first lens group having negative refractive power, the second lens group having negative refractive power, the third lens group having positive refractive power, and the fourth lens group having positive refractive power.

Furthermore, a negative lens positioned at a location closest to the object side in the second lens group preferably has aspherical surfaces, and the aspherical surface of the negative lens that is located on the image side is preferably formed in the shape in which its curvature becomes smaller with respect to its paraxial curvature toward its periphery so that distortion can be corrected far more highly.

Furthermore, it is desirable that the radius of curvature of a surface closest to the object side in the second lens group satisfy the following conditional formula (3):

$$2 < Cr3/fw < 300, \text{ where} \quad (3)$$

Cr3: radius of curvature of the surface closest to the object side in the second lens group, and fw: focal length of the entire lens system at the wide-angle end.

The conditional formula (3) is a formula which provides the ratio of the radius of curvature of the surface closest to the object side in the second lens group to the focal length of the entire lens system at the wide-angle end. If Cr3/fw reaches a value outside the range provided by the conditional formula (3), distortion becomes difficult to correct.

Embodiments of the zoom lens and numerical embodiments in which specific numerical values are applied to the embodiments will be described below.

It is assumed here that each of the embodiments adopts an aspherical shape, which is defined by the following formula (1):

$$x = \frac{y^2 \cdot c^2}{1 + (1 - \varepsilon \cdot y^2 \cdot c^2)^{1/2}} + \Sigma A^i \cdot Y^i \quad \text{[formula 1]}$$

where:

x: distance from the apex of the lens surface along the optical axis;

y: height in a direction perpendicular to the optical axis;

c: paraxial curvature at the apex of the lens;

$\varepsilon$: conical constant; and

Ai: aspherical coefficient of the i-th order.

Figure 1:
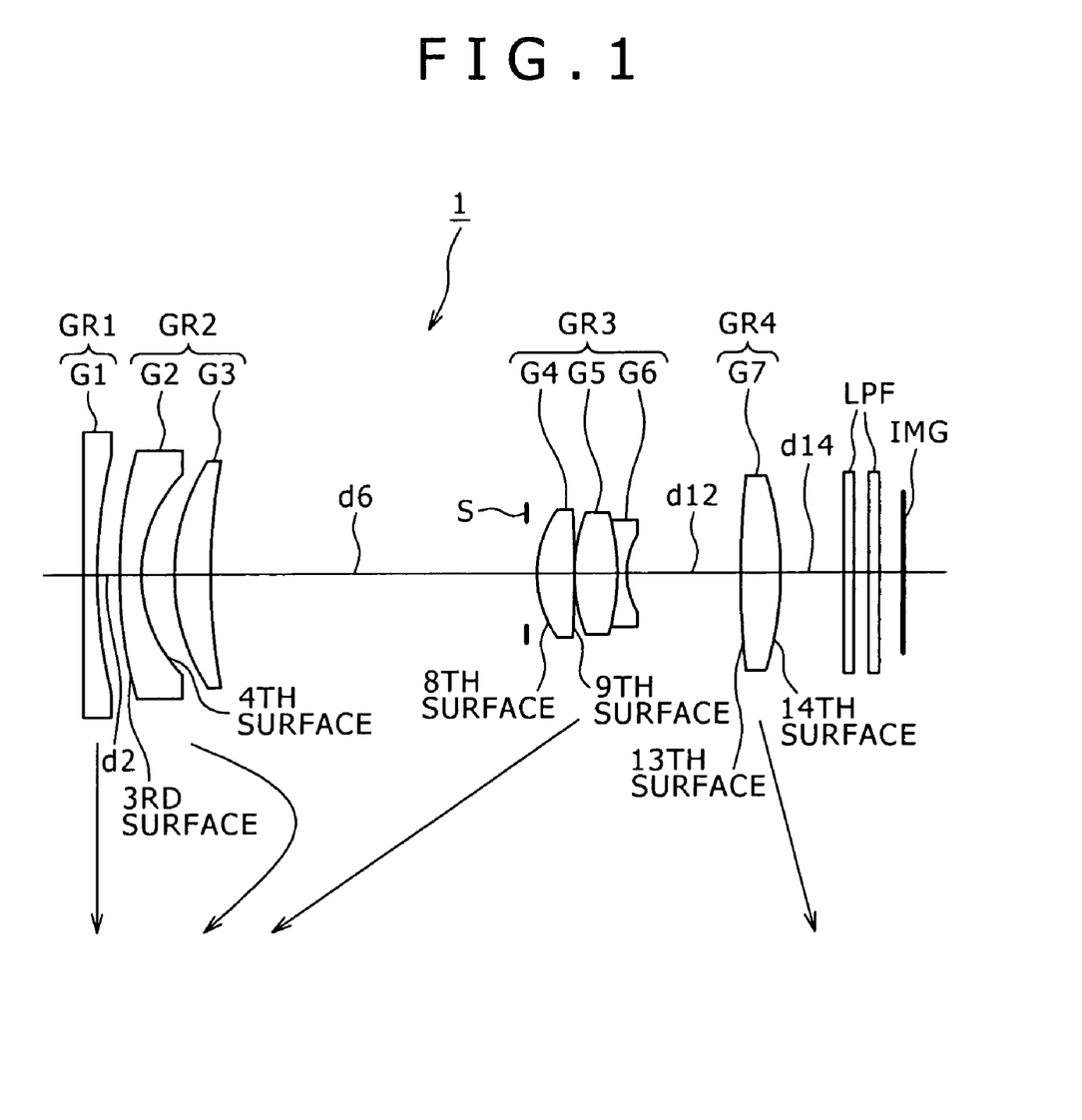
FIG. 1 is a schematic view showing the lens construction of a first embodiment of the zoom lens.

FIG. 1 is a schematic view showing the lens construction of a first embodiment of the zoom lens. A zoom lens 1 includes, in the following order from an object side, a first lens group GR1 having negative refractive power, a second lens group GR2 having negative refractive power, a third lens group GR3 having positive refractive power, and a fourth lens group GR4 having positive refractive power. During the power variation of the zoom lens 1 from its wide-angle end state to its telephoto end state, the first lens group GR1 is fixed, the second lens group GR2 temporarily moves toward an image side and then moves toward the object side, the third lens group GR3 moves toward the object side, and the fourth lens group GR4 moves toward the image side.

The first lens group GR1 is formed with a single negative lens G1. The second lens group GR2 is formed with a negative lens G2 having aspherical surfaces on both sides and a positive lens G3. The third lens group GR3 is formed with a cemented lens including a positive lens G4 having aspherical surfaces on both sides, a positive lens G5 and a negative lens G6. The fourth lens group GR4 is formed with a positive lens G7 having aspherical surfaces on both sides. An aperture stop S which moves along with the third lens group GR3 is arranged on the object side of the third lens group GR3, and a low-pass filter LPF is arranged between the fourth lens group GR4 and an image plane IMG. In this zoom lens 1, an image is shifted in a direction orthogonal to the optical axis by moving the second lens group GR2 in a direction orthogonal to the optical axis.

Table 1 shows the values of the specifications of a first numerical embodiment in which specific values are applied to the first embodiment. In Table 1, "Surface No." denotes the i-th surface counted from the object side, "R" denotes the radius of curvature of the i-th surface counted from the object side, "d" denotes the axial surface separation between the i-th surface and the (i+1)-th surface counted from the object side, "nd" denotes the refractive index at d-line ($\lambda$=587.6 nm) of a glass member having on the object side the i-th surface counted from the object side, and "vd" denotes the Abbe number at d-line of the glass member having on the object side the i-th surface counted from the object side. In addition, a radius of curvature "INFINITY" represents that the corresponding surface is a flat surface, and "ASP" represents that the corresponding surface is an aspherical surface.

TABLE 1

| Surface No. | R | d | nd | vd |
|---|---|---|---|---|
| 1: | 476.191 | 1.000 | 1.78590 | 43.934 |
| 2: | 33.479 | d2 | | |
| 3: | 28.939 (ASP) | 1.120 | 1.80611 | 40.734 |
| 4: | 7.563 (ASP) | 1.680 | | |
| 5: | 11.773 | 2.017 | 1.84666 | 23.785 |
| 6: | 31.953 | d6 | | |
| 7: | Aperture Stop | 0.700 | | |
| 8: | 6.657 (ASP) | 1.947 | 1.58313 | 59.461 |
| 9: | −44.886 (ASP) | 0.100 | | |
| 10: | 12.891 | 2.250 | 1.88300 | 40.805 |
| 11: | −11.270 | 0.450 | 1.69895 | 30.051 |
| 12: | 4.524 | d12 | | |
| 13: | 47.858 (ASP) | 2.150 | 1.58313 | 59.461 |
| 14: | −18.385 (ASP) | d14 | | |
| 15: | INFINITY | 0.440 | 1.44524 | 27.700 |
| 16: | INFINITY | 0.900 | | |
| 17: | INFINITY | 0.500 | 1.56883 | 56.044 |
| 18: | INFINITY | | | |

In the zoom lens 1, the 3rd surface, the 4th surface, the 8th surface, the 9th surface, the 13th surface and the 14th surface have aspherical surfaces, respectively. Table 2 shows the 4th-, 6th-, 8th-, and 10th-order aspherical coefficients A4, A6, A8 and A10 of each of the surfaces in the first numerical embodiment along with the conical coefficient $\varepsilon$. In addition, in each of Table 2 and the following tables showing aspherical coefficients, "E-i" is an exponential representation which is to base 10, i.e., "10-i"; for example, "0.26029E-05" represents "0.26029×10-5".

TABLE 2

| Surface No. | ε | $A^4$ | $A^6$ | $A^8$ | $A^{10}$ |
|---|---|---|---|---|---|
| 3 | 1 | −0.311416E−03 | 0.111229E−04 | −0.136701E−06 | 0.532375E−09 |
| 4 | 1 | −0.513871E−03 | 0.874921E−05 | 0.278364E−08 | −0.326877E−08 |
| 8 | 1 | −0.334707E−03 | 0.789437E−06 | −0.370811E−06 | 0.563635E−07 |
| 9 | 1 | −0.277420E−03 | 0.667975E−05 | −0.330958E−06 | 0.702791E−07 |
| 13 | 1 | −0.231164E−03 | −0.469451E−05 | 0.556075E−06 | −0.301420E−08 |
| 14 | 1 | −0.841282E−04 | −0.114305E−04 | 0.768506E−06 | −0.404874E−08 |

In the zoom lens 1, the surface separation d2 between the first lens group GR1 and the second lens group GR2, the surface separation d6 between the second lens group GR2 and the aperture stop S, the surface separation d12 between the third lens group GR3 and the fourth lens group GR4, and the surface separation d14 between the fourth lens group GR4 and the low-pass filter LPF vary during power variation. The values of the respective surface separations in the first numerical embodiment during its wide-angle endstate (f=8.10), its intermediate focal length state (f=13.77) and its telephoto end state (f=23.38) are shown in Table 3 along with a F-number FNo., a focal length f and a half angle of view ω.

TABLE 3

FNo. = 2.84~3.90~5.29
f = 8.10~13.77~23.38
ω = 30.15~18.08~10.73
d2 = 1.360~5.888~3.018
d6 = 17.254~6.431~1.280
d12 = 6.328~13.996~22.568
d14 = 3.525~2.152~1.600

Figure 2:
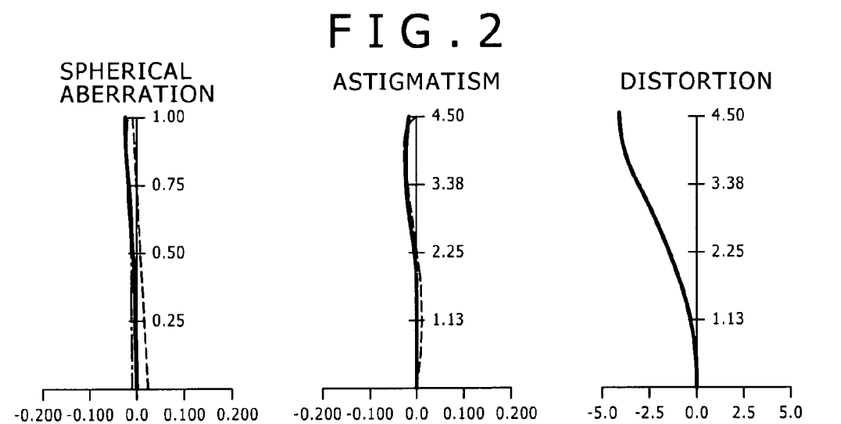
FIG. 2 is a graph showing, along with FIGS. 3 and 4, various aberrations of a first numerical embodiment obtained by applying specific numerical values to the first embodiment of the zoom lens, FIG. 2 showing a spherical aberration, an astigmatism and a distortion measured during the wide-angle end state of the first embodiment.
Figure 3:
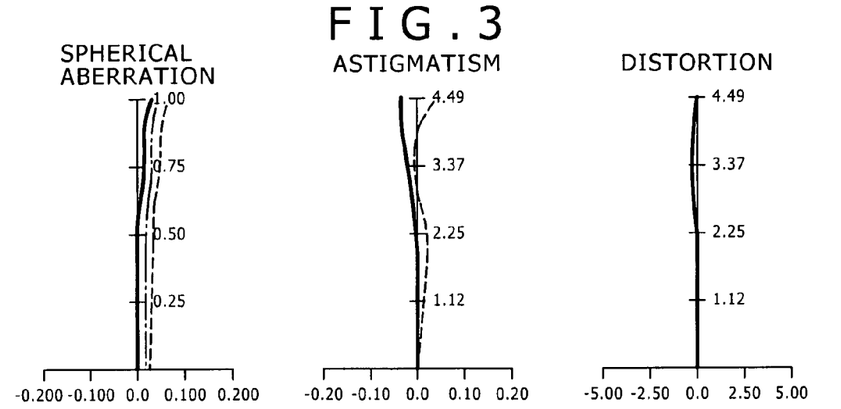
FIG. 3 is a graph showing a spherical aberration, an astigmatism and a distortion measured during the intermediate focal length state of the first embodiment.
Figure 4:
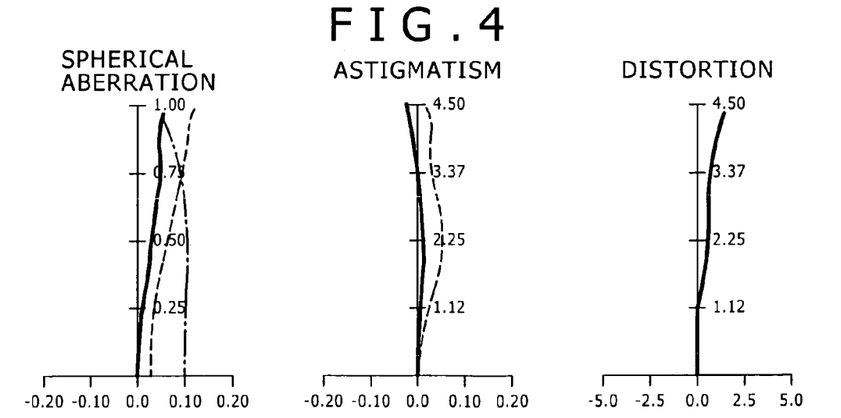
FIG. 4 is a graph showing a spherical aberration, an astigmatism and a distortion measured during the telephoto end state of the first embodiment.

Each of FIGS. 2 to 4 shows various aberrations of the first numerical embodiment which is in focus at infinity. FIG. 2 shows the aberrations measured during the wide-angle end state (f=8.10), FIG. 3 shows the aberrations measured during the intermediate focal length state (f=13.77), and FIG. 4 shows the aberrations measured during the telephoto end state (f=23.38). In the spherical-aberration graph of each of FIGS. 2 to 4 showing the various aberrations, the vertical axis represents the ratio of spherical aberration to a full-aperture F value, while the horizontal axis represents defocus, and a solid line represents spherical aberration at D-line (λ=587.6 nm), a dashed line represents spherical aberration at C-line (λ=656.28 nm), and a dot-dashed line represents spherical aberration at G-line (λ=435.84 nm). In the astigmatism graph of each of FIGS. 2 to 4, the vertical axis represents image height, while the horizontal axis represents focus, and a solid line represents a sagittal image plane and a dashed line represents a meridional image plane. In the distortion graph of each of FIGS. 2 to 4, the vertical axis represents image height, and the horizontal axis represents (the distance from the center of the lens).

Figure 5:
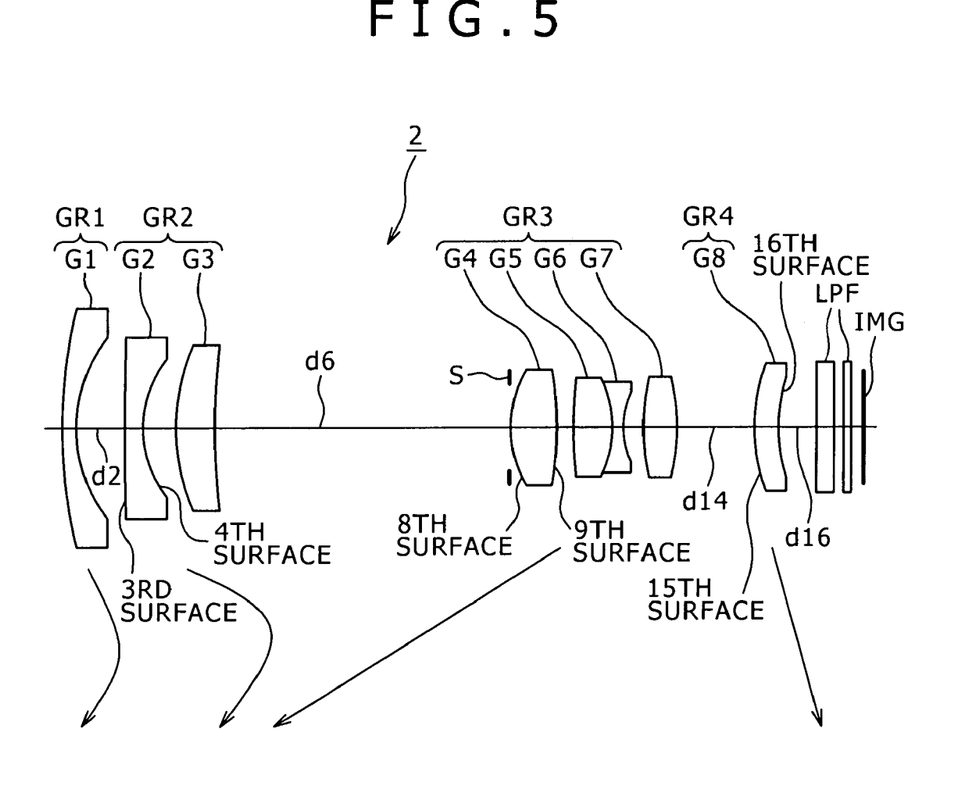
FIG. 5 is a schematic view showing the lens construction of a second embodiment of the zoom lens.

FIG. 5 is a schematic view showing the lens construction of a second embodiment of the zoom lens. A zoom lens 2 includes, in the following order from an object side, the first lens group GR1 having negative refractive power, the second lens group GR2 having negative refractive power, the third lens group GR3 having positive refractive power, and the fourth lens group GR4 having positive refractive power. During the power variation of the zoom lens 2 from its wide-angle end state to its telephoto end state, the first lens group GR1 and the second lens group GR2 temporarily move toward an image side and then move toward the object side, the third lens group GR3 moves toward the object side, and the fourth lens group GR4 moves toward the image side.

The first lens group GR1 is formed with the single negative lens G1. The second lens group GR2 is formed with the negative lens G2 having aspherical surfaces on both sides and the positive lens G3. The third lens group GR3 is formed with a cemented lens and the positive lens G7, the cemented lens including the positive lens G4 having aspherical surfaces on both sides, the positive lens G5 and the negative lens G6. The fourth lens group GR4 is formed with a positive lens G8 having aspherical surfaces on both sides. The aperture stop S which moves along with the third lens group GR3 is arranged on the object side of the third lens group GR3, and the low-pass filter LPF is arranged between the fourth lens group GR4 and the image plane IMG. In this zoom lens 2, an image is shifted in a direction orthogonal to the optical axis by moving the second lens group GR2 in a direction orthogonal to the optical axis.

Table 4 shows the values of the specifications of a second numerical embodiment in which specific values are applied to the second embodiment.

TABLE 4

| Surface No. | R | d | nd | vd |
|---|---|---|---|---|
| 1: | 32.727 | 0.900 | 1.69700 | 48.514 |
| 2: | 11.249 | d2 | | |
| 3: | 928.175 (ASP) | 1.200 | 1.77377 | 47.200 |
| 4: | 7.066 (ASP) | 2.340 | | |
| 5: | 14.852 | 2.800 | 1.84666 | 23.785 |
| 6: | 90.822 | d6 | | |
| 7: | Aperture Stop | 0.150 | | |
| 8: | 8.544 (ASP) | 3.099 | 1.58313 | 59.461 |
| 9: | −26.882 (ASP) | 1.200 | | |
| 10: | 37.037 | 2.582 | 1.48749 | 70.441 |
| 11: | −7.508 | 0.800 | 1.59270 | 35.446 |
| 12: | 7.062 | 1.390 | | |
| 13: | 14.365 | 2.150 | 1.48749 | 70.441 |
| 14: | −14.873 | d14 | | |
| 15: | 13.196 (ASP) | 1.600 | 1.77377 | 47.200 |
| 16: | 18.772 (ASP) | d16 | | |
| 17: | INFINITY | 1.200 | 1.51680 | 64.198 |
| 18: | INFINITY | 0.600 | | |
| 19: | INFINITY | 0.500 | 1.51680 | 64.198 |
| 20: | INFINITY | | | |

In the zoom lens 2, the 3rd surface, the 4th surface, the 8th surface, the 9th surface, the 15th surface and the 16th surface have aspherical surfaces, respectively. Table 5 shows the 4th-, 6th-, 8th-, and 10th-order aspherical coefficients A4, A6, A8 and A10 of each of the surfaces in the second numerical embodiment along with the conical coefficient ε.

TABLE 5

| Surface No. | ε | $A^4$ | $A^6$ | $A^8$ | $A^{10}$ |
|---|---|---|---|---|---|
| 3 | 1 | 0.225315E−03 | −0.103693E−04 | 0.314652E−06 | −0.422134E−08 |
| 4 | 1 | −0.155651E−03 | −0.180738E−04 | 0.602111E−06 | −0.134672E−07 |
| 8 | 1 | −0.310648E−03 | 0.188975E−04 | −0.253840E−05 | 0.930777E−07 |
| 9 | 1 | −0.107862E−03 | 0.253124E−04 | −0.350177E−05 | 0.141052E−06 |
| 15 | 1 | 0.338739E−03 | −0.194395E−04 | −0.193926E−06 | −0.229068E−07 |
| 16 | 1 | 0.691896E−03 | −0.904513E−05 | −0.183272E−05 | 0.000000E+00 |

In the zoom lens 2, the surface separation d2 between the first lens group GR1 and the second lens group GR2, the surface separation d6 between the second lens group GR2 and the aperture stop S, the surface separation d14 between the third lens group GR3 and the fourth lens group GR4, and the surface separation d16 between the fourth lens group GR4 and the low-pass filter LPF vary during power variation. The values of the respective surface separations in the second numerical embodiment during its wide-angle end state (f=4.85), its intermediate focal length state (f=9.22) and its telephoto end state (f=14.07) are shown in Table 6 along with a F-number FNo., a focal length f and a half angle of view ω.

TABLE 6

FNo. = 2.87~3.77~4.88
f = 4.85~9.22~14.07
ω = 38.33~21.51~14.26
d2 = 3.346~4.297~6.300
d6 = 20.044~7.578~2.399
d14 = 5.317~12.904~21.974
d16 = 2.583~1.944~1.020

Figure 6:
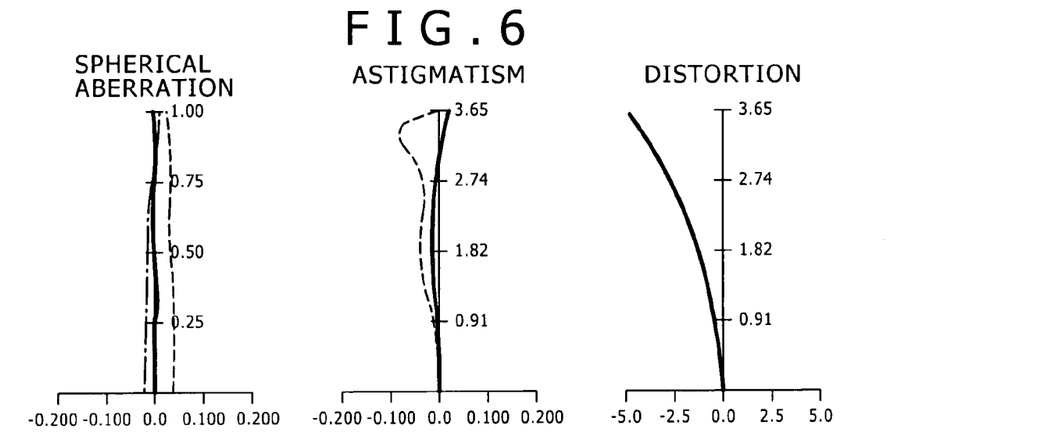
FIG. 6 is a graph showing, along with FIGS. 7 and 8, various aberrations of a second numerical embodiment obtained by applying specific numerical values to the second embodiment of the zoom lens, FIG. 6 showing a spherical aberration, an astigmatism and a distortion measured during the wide-angle end state of the second embodiment.
Figure 7:
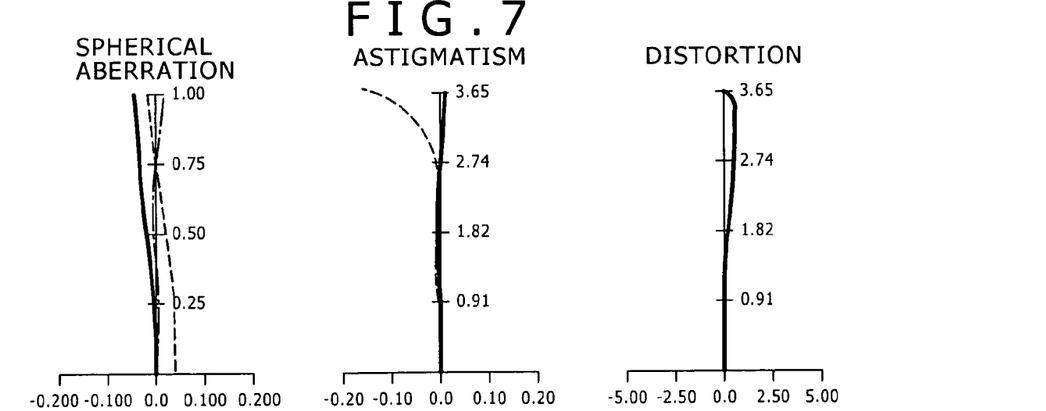
FIG. 7 is a graph showing a spherical aberration, an astigmatism and a distortion measured during the intermediate focal length state of the second embodiment.
Figure 8:
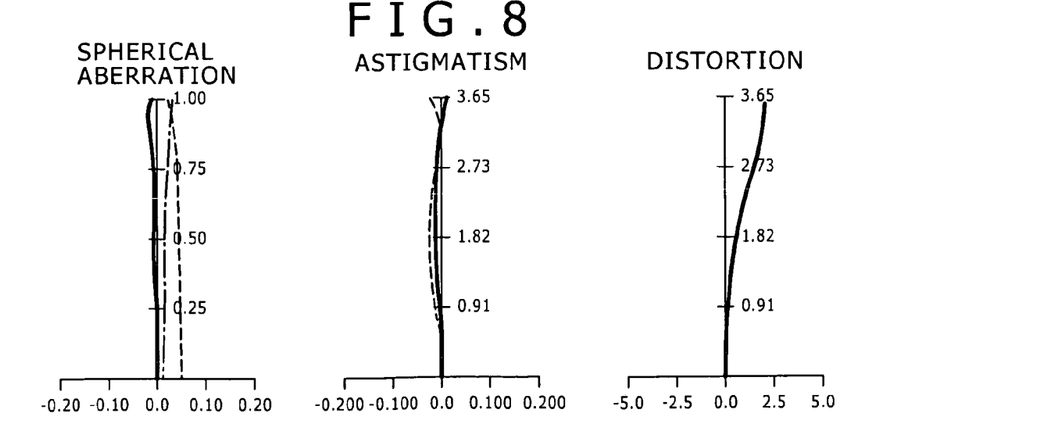
FIG. 8 is a graph showing a spherical aberration, an astigmatism and a distortion measured during the telephoto end state of the second embodiment.

Each of FIGS. 6 to 8 shows various aberrations of the second numerical embodiment which is in focus at infinity. FIG. 6 shows the aberrations measured during the wide-angle end state (f=4.85), FIG. 7 shows the aberrations measured during the intermediate focal length state (f=9.22), and FIG. 8 shows the aberrations measured during the telephoto end state (f=14.07). In the spherical-aberration graph of each of FIGS. 6 to 8 showing the various aberrations, the vertical axis represents the ratio of spherical aberration to a full-aperture F value, while the horizontal axis represents defocus, and a solid line represents spherical aberration at D-line (λ=587.6 nm), a dashed line represents spherical aberration at C-line (λ=656.28 nm), and a dot-dashed line represents spherical aberration at G-line (λ=435.84 nm). In the astigmatism graph of each of FIGS. 6 to 8, the vertical axis represents image height, while the horizontal axis represents focus, and a solid line represents a sagittal image plane and a dashed line represents a meridional image plane. In the distortion graph of each of FIGS. 6 to 8, the vertical axis represents image height, and the horizontal axis represents (the distance from the center of the lens).

Figure 9:
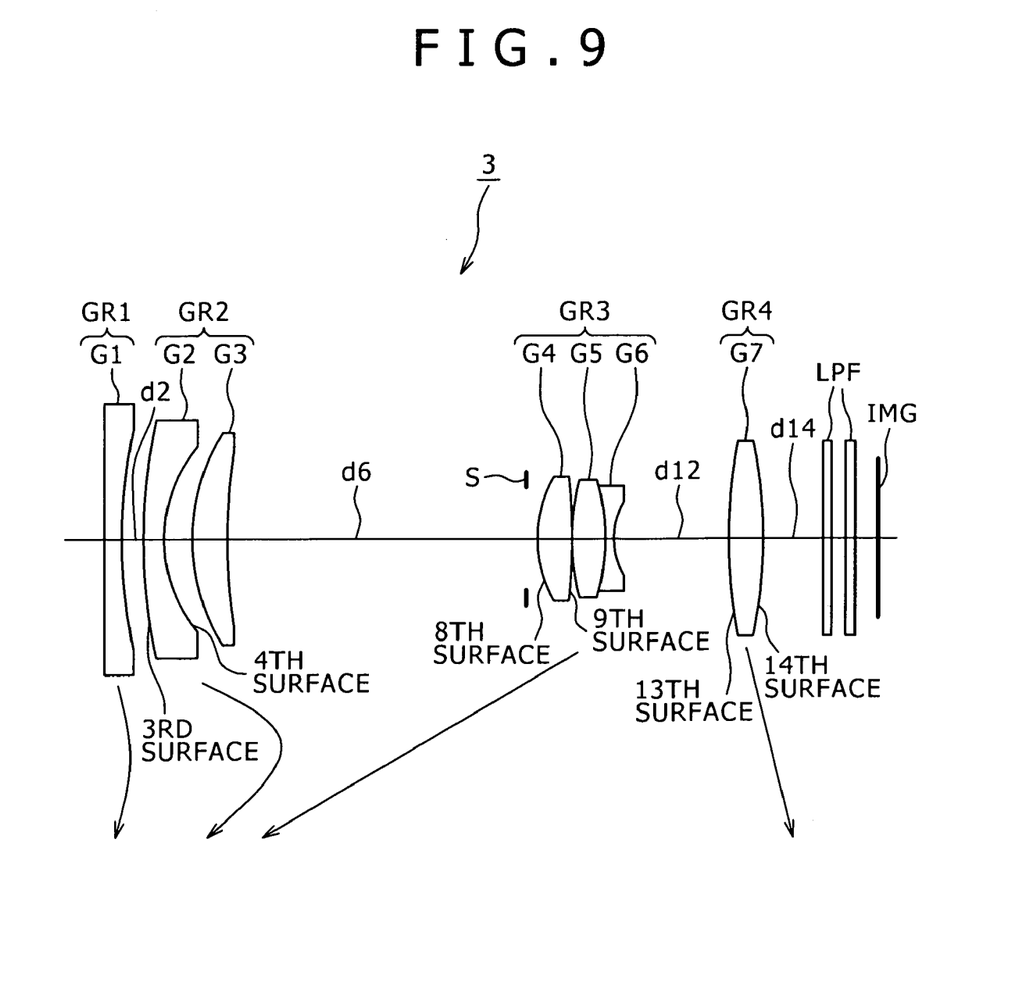
FIG. 9 is a schematic view showing the lens construction of a third embodiment of the zoom lens.

FIG. 9 is a schematic view showing the lens construction of a third embodiment of the zoom lens. A zoom lens 3 includes, in the following order from an object side, the first lens group GR1 having negative refractive power, the second lens group GR2 having negative refractive power, the third lens group GR3 having positive refractive power, and the fourth lens group GR4 having positive refractive power.

During the power variation of the zoom lens 3 from its wide-angle end state to its telephoto end state, the first lens group GR1 and the second lens group GR2 temporarily move toward an image side and then move toward the object side, the third lens group GR3 moves toward the object side, and the fourth lens group GR4 moves toward the image side.

The first lens group GR1 is formed with the single negative lens G1. The second lens group GR2 is formed with the negative lens G2 having aspherical surfaces on both sides and the positive lens G3. The third lens group GR3 is formed with a cemented lens including the positive lens G4 having aspherical surfaces on both sides, the positive lens G5 and the negative lens G6. The fourth lens group GR4 is formed with a positive lens G7 having aspherical surfaces on both sides. The aperture stop S which moves along with the third lens group GR3 is arranged on the object side of the third lens group GR3, and the low-pass filter LPF is arranged between the fourth lens group GR4 and the image plane IMG. In this zoom lens 3, an image is shifted in a direction orthogonal to the optical axis by moving the second lens group GR2 in a direction orthogonal to the optical axis.

Table 7 shows the values of the specifications of a third numerical embodiment in which specific values are applied to the third embodiment.

TABLE 7

| Surface No. | R | d | nd | vd |
|---|---|---|---|---|
| 1: | 354.049 | 1.000 | 1.78590 | 43.934 |
| 2: | 33.114 | d2 | | |
| 3: | 39.660 (ASP) | 1.120 | 1.80611 | 40.734 |
| 4: | 7.875 (ASP) | 1.620 | | |
| 5: | 12.009 | 2.105 | 1.80518 | 25.456 |
| 6: | 47.636 | d6 | | |
| 7: | Aperture Stop | 0.700 | | |
| 8: | 6.629 (ASP) | 1.904 | 1.69350 | 53.201 |
| 9: | −56.284 (ASP) | 0.100 | | |
| 10: | 13.130 | 1.800 | 1.83500 | 42.984 |
| 11: | −17.270 | 0.450 | 1.71736 | 29.501 |
| 12: | 4.436 | d12 | | |
| 13: | 24.017 (ASP) | 2.000 | 1.58313 | 59.461 |
| 14: | −24.458 (ASP) | d14 | | |
| 15: | INFINITY | 0.440 | 1.44524 | 27.700 |
| 16: | INFINITY | 0.900 | | |
| 17: | INFINITY | 0.500 | 1.56883 | 56.044 |
| 18: | INFINITY | | | |

In the zoom lens 2, the 3rd surface, the 4th surface, the 8th surface, the 9th surface, the 13th surface and the 14th surface have aspherical surfaces, respectively. Table 8 shows the 4th-, 6th-, 8th-, and 10th-order aspherical coefficients A4, A6, A8 and A10 of each of the surfaces in the third numerical embodiment along with the conical coefficient ε.

TABLE 8

| Surface No. | ε | $A^4$ | $A^6$ | $A^8$ | $A^{10}$ |
|---|---|---|---|---|---|
| 3 | 1 | −0.190135E−04 | −0.828844E−06 | 0.475428E−07 | −0.462761E−09 |
| 4 | 1 | −0.182056E−03 | −0.365764E−05 | 0.111552E−06 | −0.199236E−08 |
| 8 | 1 | −0.369117E−03 | −0.151621E−06 | −0.713651E−06 | 0.189645E−07 |
| 9 | 1 | 0.985860E−04 | 0.697875E−05 | −0.119062E−05 | 0.496804E−07 |
| 13 | 1 | 0.373094E−04 | −0.560406E−05 | 0.999786E−08 | 0.194835E−08 |
| 14 | 1 | 0.264375E−03 | −0.158033E−04 | 0.302607E−06 | −0.130693E−08 |

In the zoom lens 3, the surface separation d2 between the first lens group GR1 and the second lens group GR2, the surface separation d6 between the second lens group GR2 and the aperture stop S, the surface separation d12 between the third lens group GR3 and the fourth lens group GR4, and the surface separation d14 between the fourth lens group GR4 and the low-pass filter LPF vary during power variation. The values of the respective surface separations in the third numerical embodiment during its wide-angle end state (f=8.11), its intermediate focal length state (f=13.78) and its telephoto end state (f=23.38) are shown in Table 6 along with a F-number FNo., a focal length f and a half angle of view ω.

TABLE 9

FNo. = 2.84~3.74~5.24
f = 8.11~13.78~23.38
ω = 30.07~17.96~10.68
d2 = 1.250~1.250~1.250
d6 = 17.017~7.201~1.220
d12 = 6.608~13.158~22.630
d14 = 3.367~2.597~1.600

Figure 10:
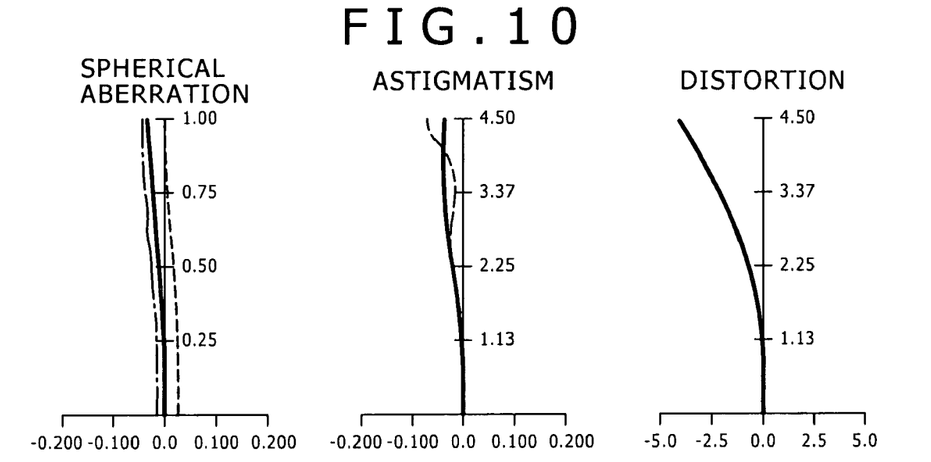
FIG. 10 is a graph showing, along with FIGS. 11 and 12, various aberrations of a second numerical embodiment obtained by applying specific numerical values to the third embodiment of the zoom lens, FIG. 10 showing a spherical aberration, an astigmatism and a distortion measured during the wide-angle end state of the third embodiment.
Figure 11:
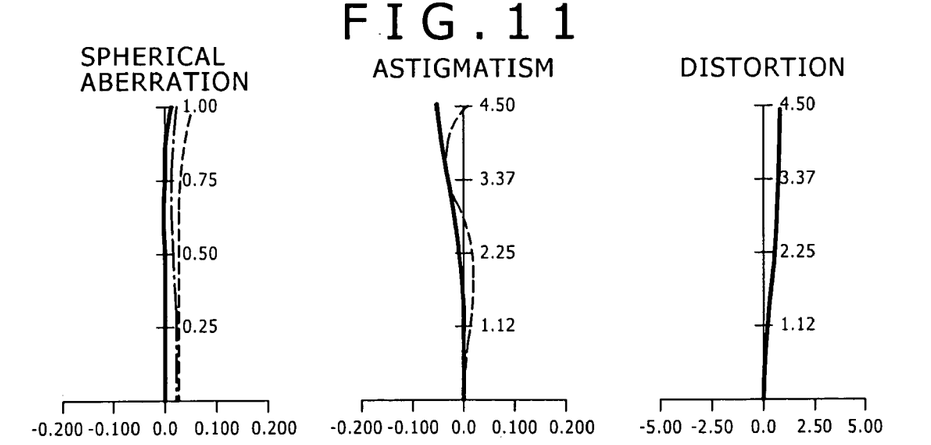
FIG. 11 is a graph showing a spherical aberration, an astigmatism and a distortion measured during the intermediate focal length state of the third embodiment.
Figure 12:
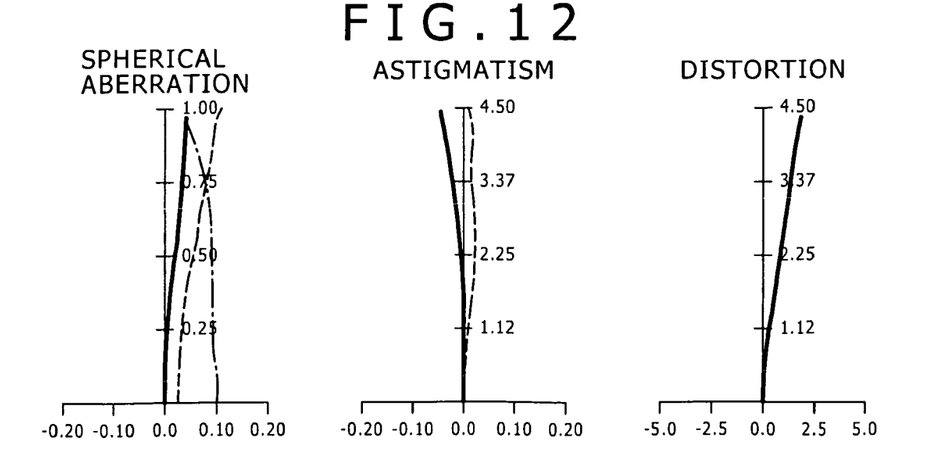
FIG. 12 is a graph showing a spherical aberration, an astigmatism and a distortion measured during the telephoto end state of the third embodiment.

Each of FIGS. 10 to 12 shows various aberrations of the third numerical embodiment which is in focus at infinity. FIG. 10 shows the aberrations measured during the wide-angle end state (f=8.11), FIG. 11 shows the aberrations measured during the intermediate focal length state (f=13.78), and FIG. 12 shows the aberrations measured during the telephoto end state (f=23.38). In the spherical-aberration graph of each of FIGS. 10 to 12 showing the various aberrations, the vertical axis represents the ratio of spherical aberration to a full-aperture F value, while the horizontal axis represents defocus, and a solid line represents spherical aberration at D-line (λ=587.6 nm), a dashed line represents spherical aberration at C-line (λ=656.28 nm), and a dot-dashed line represents spherical aberration at G-line (λ=435.84 nm). In the astigmatism graph of each of FIGS. 10 to 12, the vertical axis represents image height, while the horizontal axis represents focus, and a solid line represents a sagittal image plane and a dashed line represents a meridional image plane. In the distortion graph of each of FIGS. 10 to 12, the vertical axis represents image height, and the horizontal axis represents (the distance from the center of the lens).

Table 10 shows values corresponding to the conditional formulae (1) to (5) of the first to third numerical embodiments.

TABLE 10

| Conditional Formula | Embodiment 1 | Embodiment 2 | Embodiment 3 |
|---|---|---|---|
| (1) $(1 − β_a) × β_b$ | 0.64 | 0.57 | 0.82 |
| (2) $|f1/f2|$ | 1.192 | 1.144 | 1.226 |
| (3) Cr3/fw | 3.573 | 191.34 | 4.89 |

As is also apparent from Table 10, the first to third numerical embodiments satisfy the conditional formulae (1) and (2) and also the conditional formula (3). In addition, as shown in the aberration graphs, each of the aberrations is corrected with good balance at the wide-angle end, at the intermediate focal length between the wide-angle end and the telephoto end, and at the telephoto end.

Figure 13:
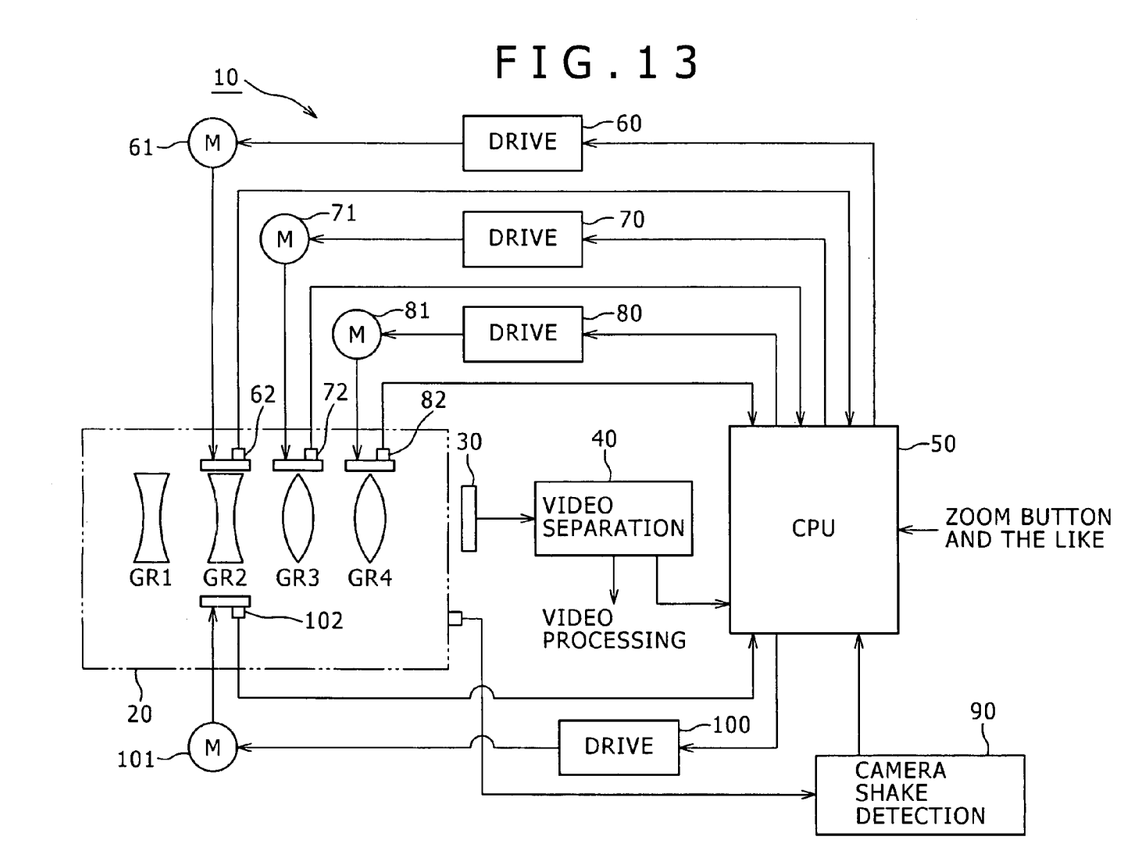
FIG. 13 is a block diagram showing an embodiment of an image capture apparatus according to the present invention.

FIG. 13 shows an embodiment of the present inventive image capture apparatus.

An image capture apparatus 10 is provided with a zoom lens 20, and has an image capture device 30 for converting an optical image formed by the zoom lens 20 into an electrical signal. A photoelectric conversion device, such as a CCD (Charge Coupled Device) or a CMOS (Complementary Metal-Oxide Semiconductor), can be applied to the image capture device 30, and a zoom lens according to the present invention can be applied to the zoom lens 20. FIG. 13 shows each of the lens groups of the zoom lens 1 according to the first embodiment in the form of a simplified single lens. As a matter of course, the zoom lens may use not only the zoom lens 1 according to the first embodiment but also either of the zoom lenses 2 and 3 according to the second and third embodiments, or a zoom lens constructed according to an embodiment other than the embodiments mentioned herein.

An electrical signal formed by the image capture device 30 is separated into a focus control signal and a video signal by a video separation circuit 40, and the focus control signal is transmitted to a control circuit 50, while the video signal is transmitted to a video processing circuit. The video signal transmitted to the video processing circuit is processed into forms suitable for t various subsequent processings, such as display on a display device, recording onto a recording medium, and transmission by communication means.

An operation signal from the outside, such as a signal based on an operation of a zoom button, is inputted to the control circuit 50, and the control circuit 50 performs predetermined processing according to the operation signal. For example, if a zooming command is inputted to the control circuit 50 from the zoom button, the control circuit 50 causes driver circuits 60, 70 and 80 to operate drive sections 61, 71 and 81 to move the lens groups GR2, GR3 and GR4 to predetermined positions, respectively. Position information about the lens groups GR2, GR3 and GR4 obtained by sensors 62, 72 and 82 are inputted to the control circuit 50, and are referred to by the control circuit 50 when the control circuit 50 is to output command signals to the driver circuits 60, 70 and 80, respectively.

The image capture apparatus 10 is provided with a camera shake correction function. When camera shake detection means 90, such as a gyrosensor, detects a shake of the zoom lens 20 due to a depression of a shutter release button, a signal from the camera shake detection means 90 is inputted to the control circuit 50, and a shake correction angle for compensating for a shake of an image due to the shake of the zoom lens 20 is calculated by the control circuit 50. In order to move the second lens group GR2 to a position based on the calculated shake correction angle, the control circuit 50 causes a driver circuit 100 to operate a drive circuit 101 to move the second lens group GR2, which is the shift lens group, in a direction orthogonal to the optical axis. The position of the second lens group GR2 in the direction orthogonal to the optical axis is detected by a sensor 102, and the position information about the second lens group GR2 obtained by the sensor 102 is inputted to the control circuit 50, and is referred to by the control circuit 50 when the control circuit 50 is to output a command signal to the driver circuit 100.

The image capture apparatus 10 can be adapted to adopt various forms for specific products. The image capture apparatus 10 can be applied to a wide range of uses, such as camera sections for digital input/output devices, for example, digital still cameras, digital video cameras, mobile phones including cameras, and PDAs (Personal Digital Assistants) including cameras.

The specific shapes of the respective sections, as well as the numerical values that have been referred to in the above description of the embodiments and the numerical embodiments, are provided merely as one example for illustrative purposes for ease of understanding of various embodiments for carrying out the present invention, and these embodiments are not to be construed as limiting the technical scope of the present invention.

The present application contains subject matter related to Japanese Patent Application JP 2005-353397 filed in the Japanese Patent Office on Dec. 7, 2005, the entire content of which are incorporated herein by reference.

What is claimed is:

1. A zoom lens comprising, in the following order from an object side:
   a first lens group including negative refractive power;
   a second lens group including negative refractive power; and
   a third lens group;
   wherein at least the second lens group and the third lens group are movable along an optical axis to perform a zooming action;
   wherein the second lens group is movable in a direction orthogonal to the optical axis to shift an image in a direction orthogonal to the optical axis;
   wherein following conditional formulae (1) and (2) are satisfied:

$$0.5 < (1-\beta\alpha) \times \beta b < 1.0, \text{ and} \quad (1)$$

$$0.1 < |f1/f2| < 1.25, \text{ where} \quad (2)$$

$\beta\alpha$: magnification of the second lens group at a telephoto end of the zoom lens;
   $\beta b$: magnification of a lens group on an image side relative to the second lens group;
   f1: focal length of the first lens group; and
   f2: focal length of the second lens group.

2. The zoom lens according to claim 1, wherein:
   the lens group on the image side relative to the second lens group includes the third lens group including positive refractive power and a fourth lens group including positive refractive power in named order toward the image side.

3. The zoom lens according to claim 1 or 2, wherein:
   the second lens group has at least one aspherical surface; and
   the aspherical surface has a shape in which its curvature becomes smaller with respect to its paraxial curvature toward its periphery.

4. An image capture apparatus comprising:
   a zoom lens including a shift lens group capable of shifting an image in a direction orthogonal to an optical axis by moving in a direction orthogonal to the optical axis;
   an image capture device converting an optical image formed by the zoom lens into an electrical signal;
   camera shake detection means for detecting a shake of the zoom lens;
   camera shake control means for calculating a shake correction angle for correcting an image shake due to the shake of the zoom lens detected by the camera shake detection means, and transmitting a correction signal for shifting the shift lens group of the zoom lens in a direction approximately orthogonal to the optical axis by an amount corresponding to the shake correction angle; and
   camera shake drive means for shifting the shift lens group of the zoom lens in the direction approximately orthogonal to the optical axis on the basis of the correction signal;
   wherein the zoom lens includes, in the following order from an object side, a first lens group including negative refractive power, a second lens group including negative refractive power, and a third lens group, at least the second lens group and the third lens group being moved along the optical axis to perform a zooming action, and the second lens group being the shift lens group movable in the direction orthogonal to the optical axis to shift an image in the direction orthogonal to the optical axis;
   wherein following conditional formulae (1) and (2) are satisfied:

$$0.5 < (1-\beta\alpha) \times \beta b < 1.0, \text{ and} \quad (1)$$

$$0.1 < |f1/f2| < 1.25, \text{ where} \quad (2)$$

$\beta\alpha$: magnification of the second lens group at a telephoto end of the zoom lens;
   $\beta b$: magnification of a lens group on an image side relative to the second lens group;
   f1: focal length of the first lens group; and
   f2: focal length of the second lens group.

5. The zoom lens according to claim 4, wherein:
   the lens group on the image side relative to the second lens group includes the third lens group including positive refractive power and a fourth lens group including positive refractive power in named order toward the image side.

6. An image capture apparatus comprising:
   a zoom lens including a shift lens group capable of shifting an image in a direction orthogonal to an optical axis by moving in a direction orthogonal to the optical axis;
   an image capture device converting an optical image formed by the zoom lens into an electrical signal;
   a camera shake detector detecting a shake of the zoom lens;
   a camera shake controller configured to calculate a shake correction angle for correcting an image shake due to the shake of the zoom lens detected by the camera shake detector, and transmit a correction signal for shifting the shift lens group of the zoom lens in a direction approximately orthogonal to the optical axis by an amount corresponding to the shake correction angle; and a camera shake driver configured to shift the shift lens group of the zoom lens in the direction approximately orthogonal to the optical axis on the basis of the correction signal;

wherein the zoom lens includes, in the following order from an object side, a first lens group including negative refractive power, a second lens group including negative refractive power, and a third lens group, at least the second lens group and the third lens group being moved along the optical axis to perform a zooming action, and the second lens group being the shift lens group movable in the direction orthogonal to the optical axis to shift an image in the direction orthogonal to the optical axis;

wherein following conditional formulae (1) and (2) are satisfied:

$$0.5 < (1-\beta a) \times \beta b < 1.0, \text{ and} \tag{1}$$

$$0.1 < |f1/f2| < 1.25, \text{ where} \tag{2}$$

$\beta a$: magnification of the second lens group at a telephoto end of the zoom lens;

$\beta b$: magnification of a lens group on an image side relative to the second lens group;

f1: focal length of the first lens group; and f2: focal length of the second lens group.

* * * * *